(12) United States Patent
DeAngelo

(10) Patent No.: US 8,654,427 B1
(45) Date of Patent: Feb. 18, 2014

(54) RUGGEDIZED TWO-AXIS OPTICAL BEAM STEERING DEVICE

(75) Inventor: Timothy J. DeAngelo, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 14 days.

(21) Appl. No.: 13/600,336

(22) Filed: Aug. 31, 2012

(51) Int. Cl.
*G02B 26/08* (2006.01)
*G02B 7/02* (2006.01)
*G02B 7/182* (2006.01)

(52) U.S. Cl.
USPC .................. 359/221.2; 359/819; 359/871

(58) Field of Classification Search
USPC ........ 359/221.2, 214, 223.1, 226.1, 819, 822, 359/871, 872, 875, 876
See application file for complete search history.

(56) References Cited

U.S. PATENT DOCUMENTS

| | | | |
|---|---|---|---|
| 4,060,314 A | 11/1977 | Heinz | |
| 4,715,694 A | 12/1987 | Eitel | |
| 4,854,687 A | 8/1989 | Fletcher | |
| 5,353,167 A * | 10/1994 | Kuklo et al. | 359/876 |
| 5,923,418 A | 7/1999 | Clark et al. | |
| 6,315,427 B1 * | 11/2001 | Simon | 362/147 |
| 7,569,824 B2 | 8/2009 | Gidseg et al. | |

* cited by examiner

*Primary Examiner* — Tuyen Tra
(74) *Attorney, Agent, or Firm* — Edwards Wildman Palmer LLP; Scott D. Wofsy

(57) ABSTRACT

An optical beam steering device is disclosed which includes a compartment for containing an optical component for interacting with an optical beam, a gimbal supporting the optical component and defining a pan axis, a roll cage rotatably supporting the gimbal and defining a tilt axis, wherein the tilt axis is orthogonal to the pan axis, and a mount that houses and rotatably supports the roll cage, wherein the angular position of the roll cage with respect to the mount and the angular position of the gimbal with respect to the roll cage are both locked from one side of the mount.

23 Claims, 15 Drawing Sheets

RUGGEDIZED TWO-AXIS OPTICAL BEAM STEERING DEVICE

BACKGROUND OF THE INVENTION

1. Field of the Invention

The subject invention is directed to mounts for positioning optics in a desired orientation, and more particularly, to a ruggedized two-axis optical beam steering device for use in military, commercial and/or laboratory applications.

2. Description of Related Art

Gimbaled optical mounts for steering laser beams are well known in the art, as disclosed for example in U.S. Pat. No. 4,854,687 to Fletcher. Many commercially available off-the-shelf optical mounts are designed for bench top use and provide direct access to the mechanisms for making precision adjustments to the position of the optical component associated therewith. Thus, a system that employs off-the-shelf optical mounts will either have those mounts located in the open or the system will be designed to allow ready access to each mount, which may require a system designer to provide a relatively substantial amount of space for each mount.

Most beam steering systems require multiple optical mounts positioned at different angles in order to steer an optical beam from a source to a desired location. Thus, a significant amount of space and access in many directions is required to make adjustments to the beam steering components. These spatial issues become most problematic when the optical mount is employed in applications such as aircraft that employ optical guidance, navigation, control, tracking systems, air data sensing, ice detection, water droplet size sensing, water content sensing and imaging, where the amount of space that is available to house the optical mount and ready access thereto is extremely limited.

Furthermore, many prior art off-the-shelf optical mounts are not designed to operate within or survive the harsh environments normally encountered in military applications involving aircraft and laser guided munitions. Indeed, they often use light springs to hold components together, and can even require significant potting or epoxy for locking the components in place to prevent them from moving once adjusted.

Many prior art optical mounts utilize three adjustment points to achieve two-axes of adjustment. This creates cross-coupling in at least one of the axes (i.e., one adjustment changes the angle of the mount around two axes), which is a disadvantage. In addition, the mechanism for locking the optical steering components on certain prior art optical mounts can alter or disrupt a previously adjusted set position of the optical component.

There is clearly a need in the art for ruggedized optical beam steering device that is relatively easy to manufacture and construct, and that can be employed in the harsh environments often encountered in applications involving aircraft, missiles and projectiles, where the available space and ready access to the optical steering device is limited.

It is therefore an object of the subject invention to provide an optical mount that is adapted and configured to hold up under the harsh conditions encountered in aerospace applications. It is a further object of the subject invention to provide an optical mount for positioning an optical component about two orthogonal axes without causing cross-coupling at the optical surface of the component, and to provide a two-axis optical mount that can be mechanically locked without altering any previously adjusted angular positions of the optical component.

SUMMARY OF THE INVENTION

The subject invention is directed to a new and useful ruggedized two-axis optical beam steering device for use in conjunction with a variety of aerospace systems and applications including aircraft, missiles and projectiles, where mounting space is at a premium and access to the device for making angular adjustments to the optics is limited. It is also envisioned that the subject invention can be modularized and used in a laboratory environment.

The device includes an optical component for interacting with or otherwise directing an optical beam, a gimbal supporting the optical component and defining a pan axis, and a roll cage rotatably supporting the gimbal and defining a tilt axis, wherein the tilt axis is orthogonal to the pan axis. These parts are relatively inexpensive and simple to manufacture and assemble, which is an advantage over prior art optical beam steering devices.

The device further includes a mount that houses and rotatably supports the roll cage. First fastening means are provided for locking the angular position of the roll cage with respect to the mount from an area located on the first side of the mount, and second fastening means are provided for locking the angular position of the gimbal with respect to the roll cage from the area located on the first side of the mount. In other words, the angular position of the roll cage about its tilt axis with respect to the mount and the angular position of the gimbal about is pan axis with respect to the roll cage are both mechanically locked from a common side of the mount.

The device also includes adjusting means external to the mount for independently adjusting the angular position of the gimbal about the pan axis and the angular position of the roll cage about the tilt axis. By enabling the independent adjustment of the angular position of the gimbal and roll cage, the problems associated with cross-coupling are eliminated, which is an advantage over prior art optical mounts.

In accordance with a preferred embodiment of the subject invention, the adjusting means is adapted and configured to make, independent adjustments of the angular position of the gimbal and the angular position of the roll cage from the area located on the first side of the mount. In other words, the angular position of the gimbal and the angular position of the roll cage are independently adjusted from a common side of the mount. Moreover, the area in which the angular adjustments are made is preferably on the same side of the mount as the area in which the angular positions of the gimbal and roll cage are mechanically locked.

Importantly, the beam steering device of the subject invention is adapted and configured so that the act of individually mechanically locking the angular position of the gimbal and roll cage about their respective axes will not disrupt any of the angular adjustments that were previously made. It is envisioned however, that in certain instances where appropriate, the angular adjustments to the gimbal and roll cage can be made from one side of the mount while the angular position of the gimbal and roll cage can be mechanically locked from another side of the mount. This alternative configuration remains within the scope of the subject disclosure.

The adjusting means includes a stage or fixture configured to be releasably secured to the first side of the mount using threaded fasteners or the like. The fixture can be mounted on the first side of the mount such that a common side of the mount is used for adjustment and locking of both pan and tilt angular positions. The fixture includes an elongated adjustment shaft for mechanically interacting or otherwise coupling with an axle of the gimbal. A first manual control knob is operatively associated with the adjustment shaft for selectively adjusting the angular position of the gimbal about the pan axis. A second manual control knob operatively associated with the adjustment shaft for selectively adjusting the angular position of the roll cage about the tilt axis. It is envisioned that the adjusting means for independently positioning the gimbal and the roll cage can be automated or motorized so as to dynamically steer the optical component to a desired position within the optical mount.

It is also envisioned and well within the scope of the subject disclosure that a control knob or other means could be provided to selectively adjust the axial position of the roll cage along the tilt axis relative to the mount, providing an additional degree of precision adjustment for the optical component.

The means for locking the angular position of the roll cage with respect to the mount includes at least one set pin or threaded fastener for frictionally and/or compressively engaging an exterior surface of the roll cage through openings in the mount. Preferably, two fasteners are provided to lock the angular position of the roll cage. The means for locking the angular position of the gimbal with respect to the roll cage includes at least one set pin or threaded fastener for frictionally and/or compressively engaging an exterior surface of the gimbal through openings in the roll cage. Preferably, two fasteners are provided to lock the angular position of the roll cage.

The roll cage includes a side opening for receiving the gimbal and an interior seat for accommodating the gimbal. In one embodiment of the invention, the roll cage includes two half-sections for mounting the gimbal, and the gimbal includes opposed hubs for rotatably engaging corresponding openings in each half-section of the roll cage. The gimbal preferably includes an interior seat for accommodating the optical component. The seat is adapted and configured so that the center of an optical surface of the optical component seated therein is aligned with the pan axis of the gimbal and in the same plane as the tilt axis of the roll cage. That is, the axis of rotation for the gimbal is in the same geometric plane as the axis of rotation for the roll cage.

These and other features of the optical steering device of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the ruggedized two-axis optical beam steering device of the subject invention without undue experimentation, preferred embodiments thereof will be described in detail hereinbelow with reference to certain figures, wherein.

DETAILED DESCRIPTION OF PREFERRED EMBODIMENTS

Figure 1:
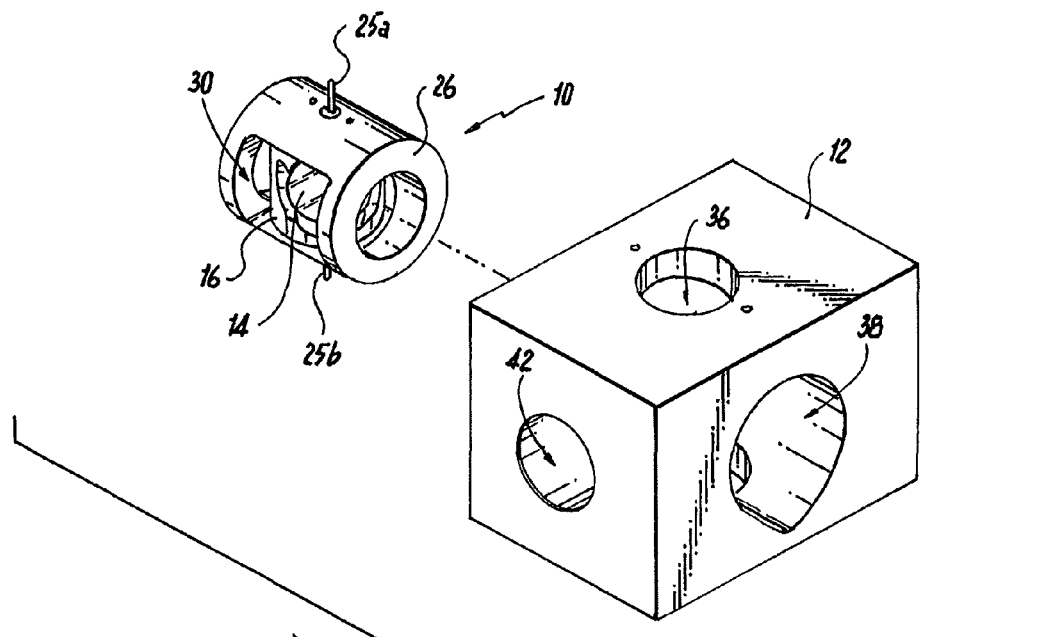
FIG. 1 is a perspective view of an optical beam steering device constructed in accordance with a preferred embodiment of the subject invention, wherein the device is separated from a generic supporting mount.

Referring now to the drawings wherein like reference numerals identify similar structural features or elements of the preferred embodiments disclosed herein, there is illustrated in FIG. 1 a ruggedized two-axis optical beam steering device constructed in accordance with a preferred embodiment of the subject invention and designated generally by reference numeral 10.

For ease of illustration, the optical beam steering device 10 is shown in conjunction with a generic version of a mounting structure 12 configured to operatively support or otherwise mount the beam steering device 10. It should be readily appreciated by those having ordinary skill in the art that an actual mounting structure or mount for the beam steering device 10 would likely form part of a product body in an aircraft, missile or projectile, and would therefore conform with the system or componentry in which it is employed, for example, within a sensor body.

Figure 2:
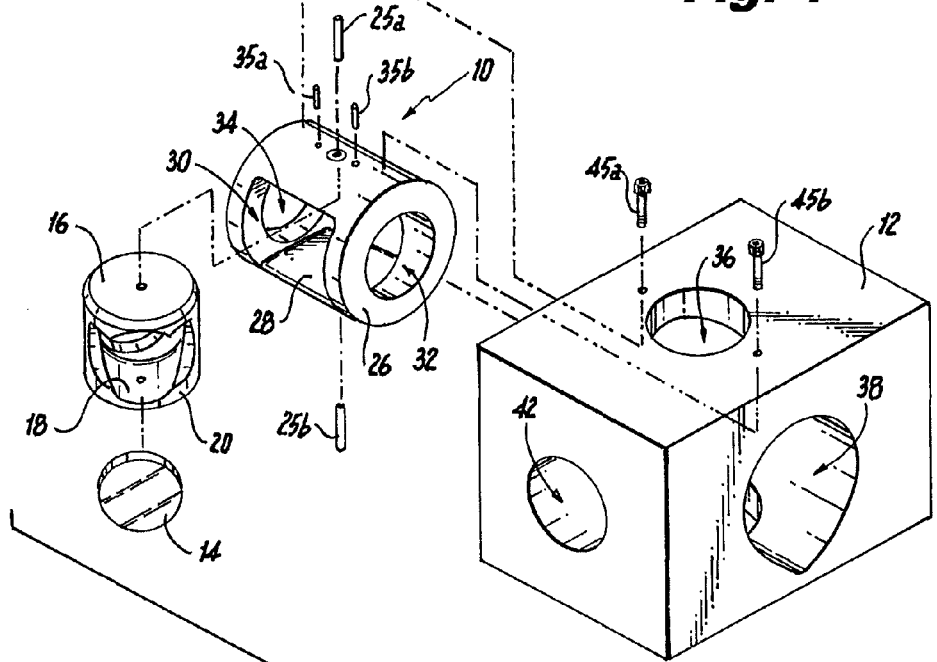
FIG. 2 is an exploded perspective view of the optical beam steering device shown in FIG. 1, with the component parts thereof separated for ease of illustration, including the optical component, the gimbal supporting the optical component and the roll cage rotatably supporting the gimbal.

Referring to FIG. 2, the optical steering device 10 of the subject invention includes an optical component 14 for interacting with or otherwise directing an optical beam, such as a laser beam. The optical component 14 can take the form of a lens, optical mirror, metallic mirror, reflector, diffraction grating, band pass filter, color glass filter, wave plate, beam splitter, beam expander, window or the like.

The optical component 14 of steering device 10 is supported within a generally cylindrical gimbal 16. More particularly, the gimbal 16 has a seating area 18 for receiving and supporting the optical component 14. The seating area 18 is accessed through a primary portal 20 in the side wall of the gimbal 16. The position of the optical component 14 is fixed within the seating area 18, so that the optical surface of the component is advantageously aligned with the center of rotation of the gimbal 16 and passes through the center point of the optical surface, as explained in more detail below.

With continuing reference to FIGS. 1 and 2, the gimbal 16 is rotatably supported within a generally cylindrical roll cage 26. More particularly, the gimbal 16 is rotatably supported in roll cage 26 by upper and lower axle pins 25a, 25b. The axle pins 25a, 25b define a pan axis about which the gimbal 16 rotates relative to roll cage 26. Preferably, the center of rotation of the roll cage 26 passes through the center point of the optical surface of the optical component 14. Moreover, the center of rotation of the gimbal 16 and the center of rotation of the roll cage 26 lie on the same geometric plane. This simplifies the scope of the adjustment to angular movements only, minimizing or otherwise eliminating translation of the beam during the adjustment process.

A seating area 28 is formed within the roll cage 26 for accommodating the gimbal 16. The seating area 28 is accessed through a lateral portal or opening 30. Threaded fasteners 35a, 35b are provided for fixing or otherwise locking the angular the position of the gimbal 16 relative to the roll cage 26. More particularly, the gimbal fasteners 35a, 35b are dimensioned and configured to frictionally and/or compressively engage the upper surface of the gimbal 16 through the wall of the roll cage 26. It is envisioned that a single fastener could also be used to secure the position of the gimbal relative to the roll cage. Openings 30, 32 and 34 accommodate beam passage through the roll cage 26 during use. Those skilled in the art will readily appreciate that the number and location of the openings in the roll cage 26 can vary depending upon the application, and more particularly, depending upon the type of optical component 14 employed in the device 10.

The roll cage 26 is rotatably supported within the mounting structure 12. More particularly, the mounting structure 12 defines a cylindrical bore 38 for accommodating rotation of the roll cage 26. An opening 36 is provided in an exterior surface of the mounting structure 12 for gaining ready access to threaded fasteners 35a, 35b to lock the position of the gimbal 16.

Roll cage 26 defines a tilt axis about which the roll cage moves relative to the mounting structure 12. A pair of threaded fasteners 45a, 45b are provided for fixing or otherwise locking the angular position of roll cage 26 relative to the mounting structure 12. It is envisioned that a single fastener could also be used to secure the position of the roll cage 16 relative to the mounting structure 12. The roll cage fasteners 45a, 45b are dimensioned and configured to frictionally and/ or compressively engage the upper surface of the roll cage 16 through the wall of the mounting structure 12. The roll cage fasteners 45a, 45b are advantageously located on the same side of the mounting assembly 12 as the gimbal fasteners 35a, 35b. Thus, both axes of adjustment are individually mechanically locked from one side of the mounting structure 12.

At least one side opening 42 is provided in mounting structure 12 to accommodate beam passage through the mounting structure 12 during use. Moreover, depending upon the type of optical component employed, the mounting structure may need multiple openings or windows to accommodate the beam. For example, if the optical component is used for beam sampling, one opening will be needed for the input beam and two openings will be needed for two exit beams.

Figure 3:
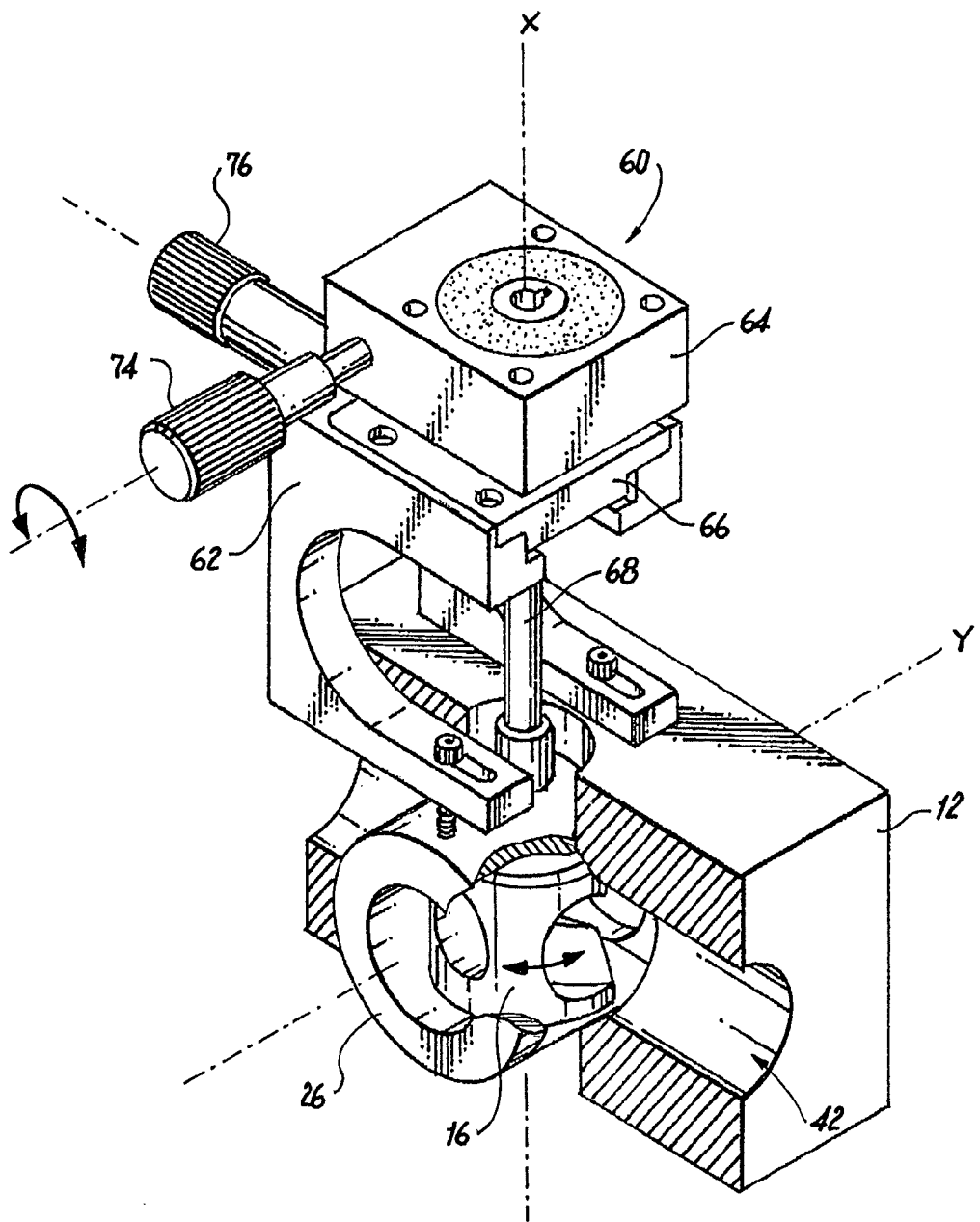
FIG. 3 is a perspective view of the optical beam steering device of FIGS. 1 and 2, supported within the mount and operatively connected to an externally mounted fixture for independently adjusting the angular position of the gimbal about a pan axis and the angular position of the roll cage about a tilt axis, wherein rotation of the gimbal about the pan axis is depicted.

Referring now to FIG. 3, the subject invention further includes an adjustment mechanism 60 for selectively adjusting the position of the rotatable components of the optical steering device 10 from a location external to the mounting structure 12. More particularly, the adjustment mechanism 60 is adapted and configured to independently adjust the angular position of the gimbal 16 about the pan axis "X" and the angular position of the roll cage 26 about the tilt axis "Y".

The adjustment mechanism 60 advantageously facilitates these optical adjustments from an external location that is on the same side of the mounting structure 12 as the access points for the gimbal fasteners 35a, 35b and the roll cage fasteners 45a, 45b. Thus, independent mechanical adjustment of both the pan axis and the tilt axis, as well as the act of independently mechanically locking the angular positions of the gimbal 16 and roll cage 26 are accomplished from the same area on one side of the mounting structure 12. By enabling independent angular adjustment of the gimbal and roll cage about their respective axes, the problems associated with crosscoupling are eliminated.

This unique feature of the subject invention is particularly useful when the steering device 10 is employed in an environment where there is a limited amount of space for accessing and selectively adjusting the optical component, such as, for example, in the case of military and aerospace applications. It is envisioned however, that in some instances the angular adjustments to the gimbal and roll cage can be made by locating the adjustment mechanism 60 on one side of the mounting structure 12, while the angular position of the gimbal 16 and roll cage 26 can be mechanically locked using fasteners accessed from another side of the mounting structure 12.

The adjustment mechanism 60 includes a fixture or stage 62 which is removably fastened to the mounting structure 12 by means not directly associated with the steering device 10. Adjustment mechanism 60 further includes an upper transmission box 64 and a lower guide box 66. Both transmission box 64 and guide box 66 are operatively associated with an elongated adjustment shaft 68.

Figure 5:
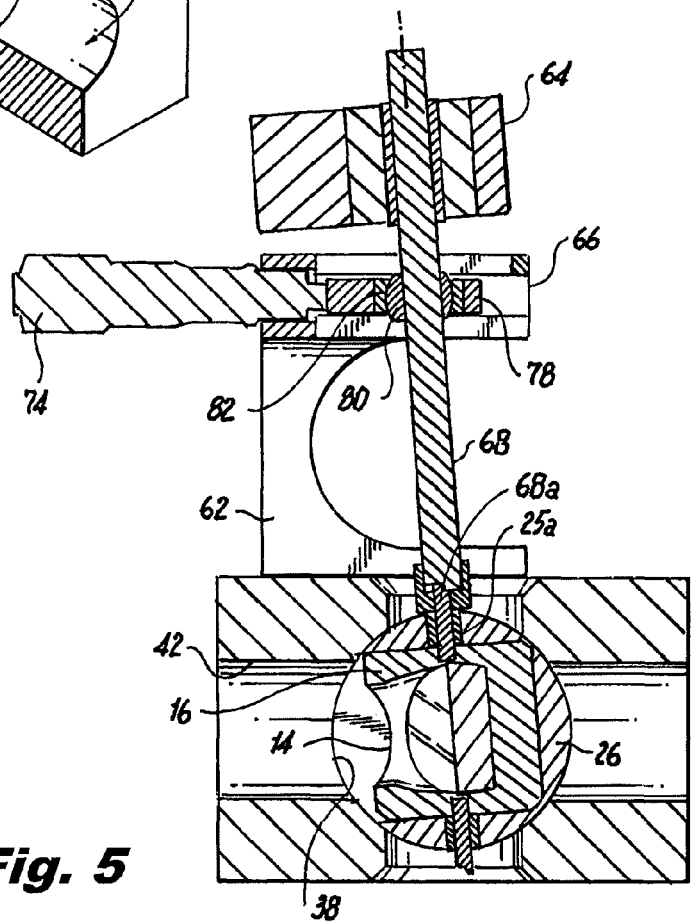
FIG. 5 is a cross-sectional view taken along line 5-5 of FIG. 4, illustrating the displaced position of the roll cage, rotated through an angle of approximately 5° about the tilt axis, relative to the supporting mount.

The distal end of adjustment shaft 68 is mechanically coupled to either the upper or lower gimbal axle pin 25a or 25b of optical steering device 10, as best seen in FIG. 5. More particularly, as shown in FIG. 5, the distal end of adjustment shaft 68 has a recessed surface 68a for interacting with upper gimbal axle pin 25a. It is envisioned that other fastening methods may be used for mechanically coupling the distal end of adjustment shaft 68 to the axle pin 25a or 25b, including threaded fasteners or the like.

Referring again to FIG. 3, an upper manual control knob 74 is operatively associated with the upper transmission box 64 first selectively controlling the axial rotation of the adjustment shaft 68, and hence the independent angular rotation of the gimbal 16 relative to the roll cage 26 about the pan axis "X". Those skilled in the art will readily appreciate that a set of bevel gears or the like could be provided within the upper transmission box 64 to facilitate the transfer of rotational movement between control knob 74 and adjustment shaft 68.

Figure 4:
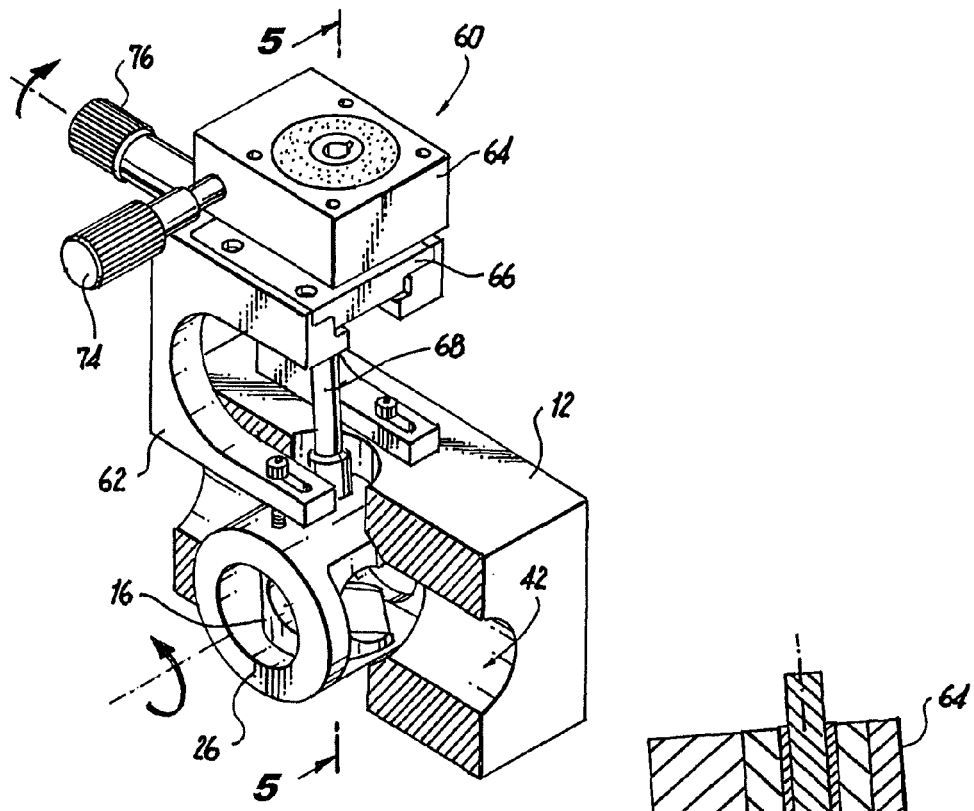
FIG. 4 is a cross-sectional view as in FIG. 3, showing angular rotation of the roll cage about the tilt axis through manipulation of a control knob.

A lower manual control knob 76 is operatively associated with a linear guide in the lower guide box 66 for selectively controlling the tilt angle of adjustment shaft 68, and hence the independent angular rotation of the roll cage 26 relative to the mounting structure 12 about the tilt axis "Y" as illustrated in FIGS. 4 and 5. As best seen in FIG. 5, the lower control knob 76 is operatively connected to a sliding plate 78 retaining a spherical bearing 80 through which adjustment shaft 68 passes. The outer race 82 of the spherical bearing 80 is press fit into the plate 78, and the adjustment shaft 68 is held with a clearance fit within the spherical bearing 80. A tension spring (not shown) may be provided for acting on the plate 78. Rotation of the lower control knob 76 causes corresponding lateral sliding movement of the plate 78, resulting in the angular movement of the control shaft 68 within the lower transmission box 66. The manual control knob 74 is preferably the input shaft to a gearbox and the manual control knob 76 is preferably configured as a precision micrometer head such as those available from L. S. Starrett Company of Athol, Mass.

Figure 6:
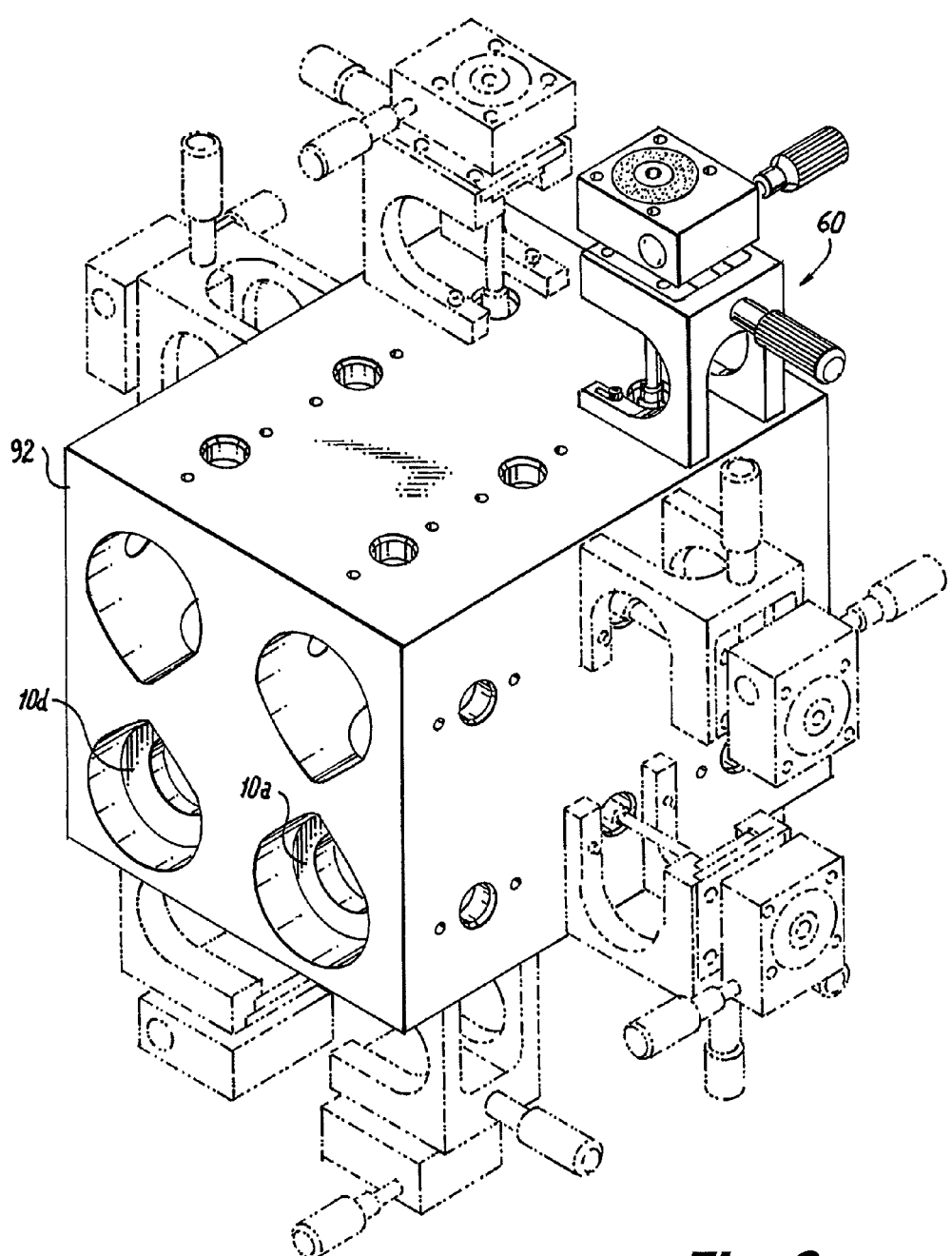
FIG. 6 is a perspective view of a mounting assembly that includes multiple optical steering devices of the type shown in FIG. 1, arranged in such a manner so as to achieve a complex path for an optical beam traveling through the mounting assembly.
Figure 7:
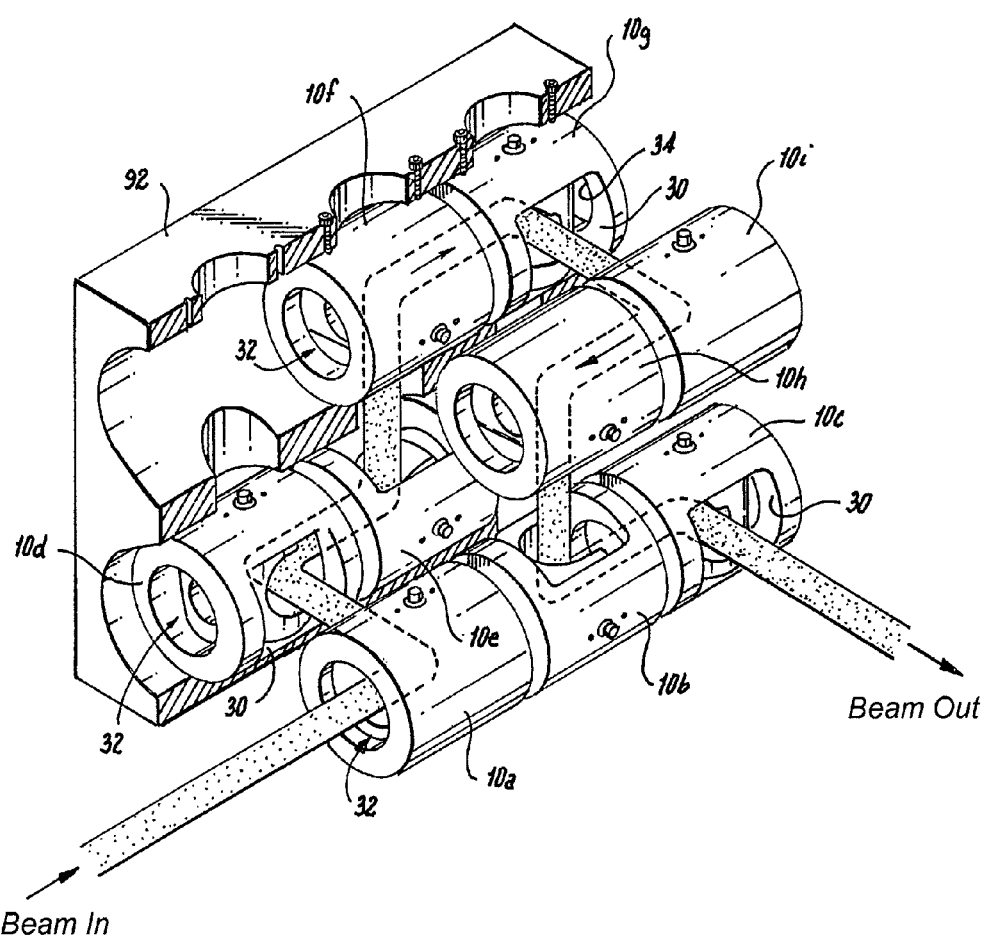
FIG. 7 illustrates the relative orientation of each of the optical steering devices supported within the mounting assembly and the path of an optical beam traveling through the mounting assembly shown in FIG. 6.

Referring to FIGS. 6 and 7, there is illustrated a mounting structure 92 that includes a plurality of optical steering devices constructed in accordance with a preferred embodiment of the subject invention, which are arranged in such a manner so as to achieve an example of a complex optical path for a laser beam. More particularly, as best seen in FIG. 7, the mounting structure 92 supports nine optical steering devices 10a-10i, the orientations of which are mechanically adjusted relative to one another using the adjustment mechanism 60 described above, and they are all subsequently locked in place within the mounting structure using their respective gimbal fasteners 35a, 35b and roll cage fasteners 45a, 45b.

As shown in FIG. 7, an optical beam is steered through mounting structure 92 along a defined complex path. The beam initially enters the mounting structure 92 through the forward opening 32 of steering device 10a. It is reflected 90° to the left by the optical component located therein and it then exits the side opening 30 of steering device 10a. The beam then enters the opposing side opening 30 of steering device 10d, it is reflected 90° to the rear by the optical component located therein and exits the aft opening 34 of steering device 10d. Then the beam enters the forward opening 32 of steering device 10e, it is reflected 90° upward by the optical component located therein and it exits the side opening 30 of steering device 10e, which is facing the steering device 10f therabove.

Upon exiting steering device 10e, the beam enters the side opening 30 of steering device 10f, it is reflected 90° to the rear by the optical component located therein, and exits through aft opening 34 of steering device 10f. The beam then enters the forward opening 32 of steering device 10g, it is reflected 90° to the right by the optical component located therein, and exits through the side opening 30 of steering device 10g. Then the beam enters the side opening 30 of steering device 10i, it is reflected 90° forward by the optical component located therein, and exits the forward opening 32 of steering device 10i.

The beam then enters the aft window 34 of steering device 10h, it is reflected 90° downward by the optical component located therein, and exits the side opening 30 of steering device 10h, which is facing downward toward the steering device 10b therebelow. The beam then enters the side opening 30 of steering device 10b, it is reflected 90° to the rear by the optical component located therein and exits the aft opening 34 of steering device 10b. Then the beam enters the forward opening 32 of steering device 10c, it is reflected 90° to the right by the optical component located therein and exits the side opening 30 of steering device 10c, which is the exit point for the steering arrangement within mounting structure 92. Those skilled in the art will readily appreciate that the optical beam steering system shown in FIGS. 6 and 7 can be rearranged and selectively adjusted to achieve a multiplicity of different optical paths for a variety of applications.

Figure 8:
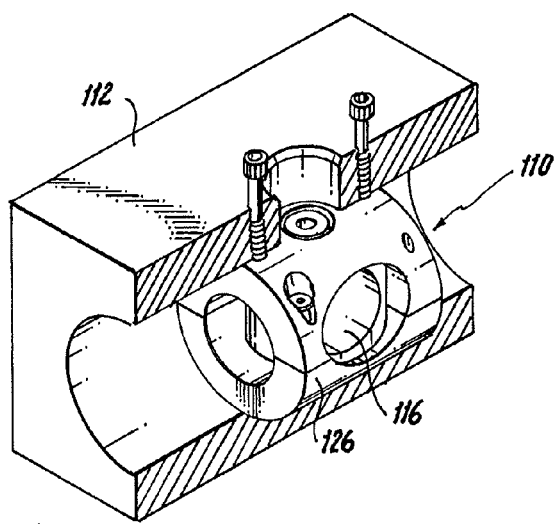
FIG. 8 is a perspective view of another optical beam steering device constructed in accordance with a preferred embodiment of the subject invention, shown within a supporting mount.
Figure 9:
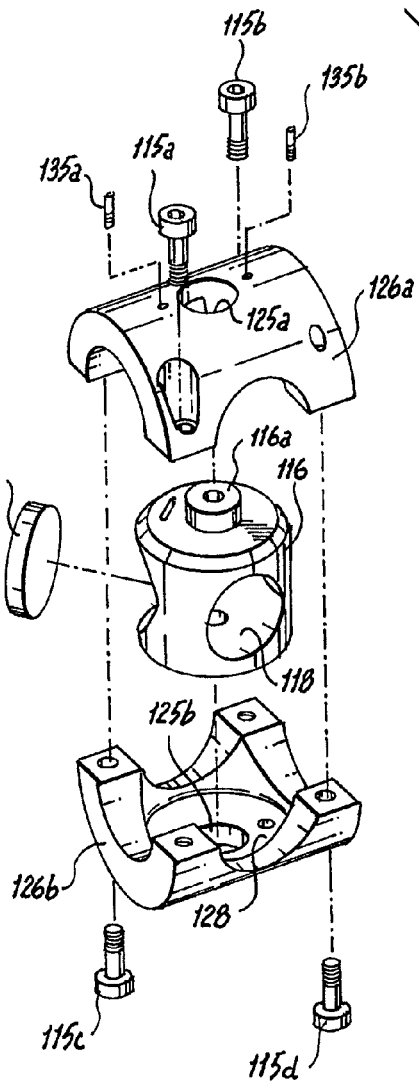
FIG. 9 is an exploded perspective view of the optical beam steering device shown in FIG. 8, with the component parts thereof separated for ease of illustration, including the optical component, the gimbal supporting the optical component and a two-part roll cage rotatably supporting the gimbal.
Figure 10:
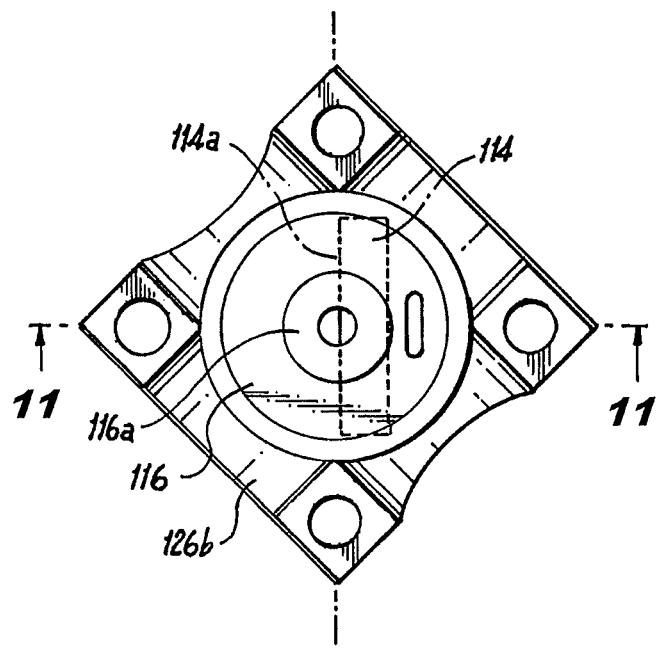
FIG. 10 is a top plan view of the optical beam steering device shown in FIG. 8, with the upper half of the roll cage removed to illustrate the gimbal that is rotatably supported therein.

Referring now to FIGS. 8 and 9, there is illustrated another embodiment of an optical beam steering device constructed in accordance with a preferred embodiment of the subject invention and designated generally by reference numeral 110, which is operatively supported within a generic mount 112. Optical steering device 110 is substantially similar to the optical steering device 10 described above and shown in FIGS. 1 and 2, in that it includes an optical component 114, a gimbal 116 supporting the optical component 114 within a seat 118, and a roll cage 126 rotatably supporting the gimbal 116 within a seat 128. As in the previous embodiment, threaded fasteners or the like are provided to independently lock the angular position of the roll cage 126 about its tilt axis with respect to the mounting 112 and the angular position of the gimbal 116 about its pan axis with respect to the roll cage 126.

There are, however, certain structural differences between the two steering devices. In particular, the roll cage 126 of steering device 110 includes upper and lower half-sections 126a, 126b, which are secured together using a plurality of threaded fasteners 115a-115d. This arrangement makes for relatively easy assembly and disassembly of the roll cage 126, and it provides an enhanced method of mounting or otherwise locking the angular position of the gimbal 116 within the roll cage 126 of steering device 110, together with or apart from gimbal fasteners 135a, 135b directly associated with the roll cage 126.

Figure 11:
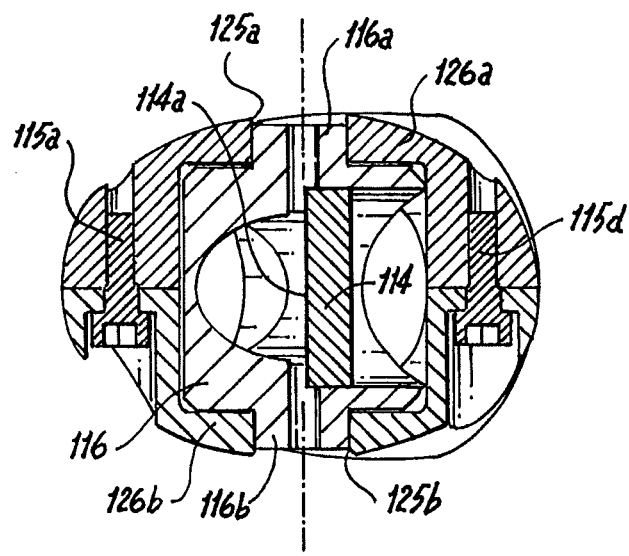
FIG. 11 is a cross-sectional view taken along line 11-11 of FIG. 10, with the upper half of the roll cage shown, and illustrating the location of the optical surface of the optical component aligned with the pan axis of the gimbal and in the same plane as the tilt axis of the roll cage.

The gimbal 116 of optical steering device 110 differs from gimbal 16 of optical steering device 10 in that it includes upper and lower hub portion 116a, 116b, rather than the axle pins 25a, 26b. (See FIG. 11). The hub portions 116a, 116b reside within corresponding openings 125a, 125b in the upper and lower half-sections 126a, 126b of roll cage 126, and they support the angular rotation of the gimbal 116 within the roll cage 126, about the pan axis of the gimbal 116. As best seen in FIG. 11, the front optical surface 114a of optical component 114 is located on the center of rotation of the gimbal 116, and the optical component 114 is inserted into the seating area 118 of gimbal 116 from the rearward side of the gimbal 116. Moreover, the interior seating area 118 of gimbal 116 is adapted and configured to that the pan axis of rotation of the gimbal 116 is in the same plane as the tilt axis of rotation for the roll cage 126.

Figure 12:
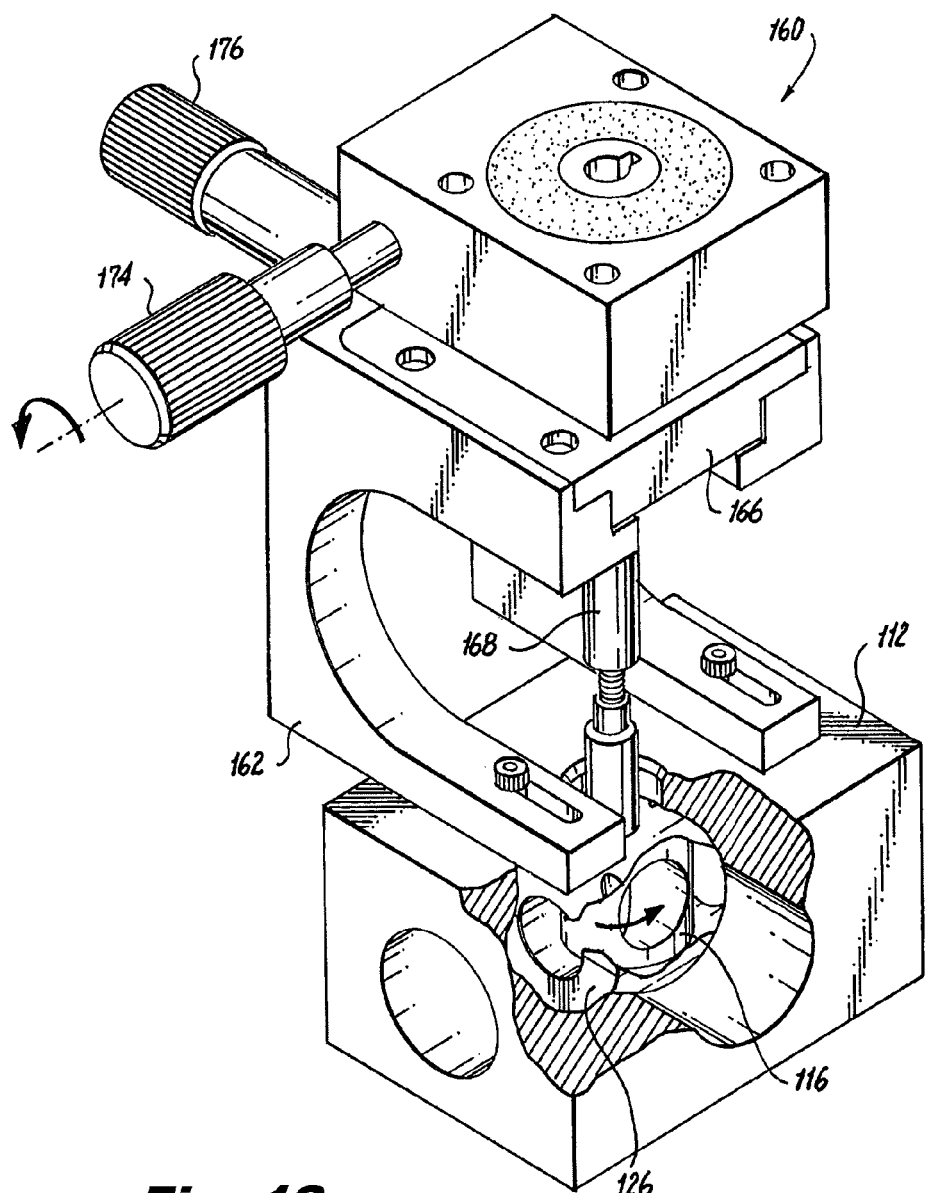
FIG. 12 is a perspective view of the optical beam steering device of FIGS. 8 and 9, wherein the mount is operatively associated with an externally mounted fixture for independently adjusting the angular position of the gimbal about a pan axis and the angular position of the roll cage about a tilt axis, wherein rotation of the gimbal about the pan axis is shown through manipulation of a control knob.
Figure 13:
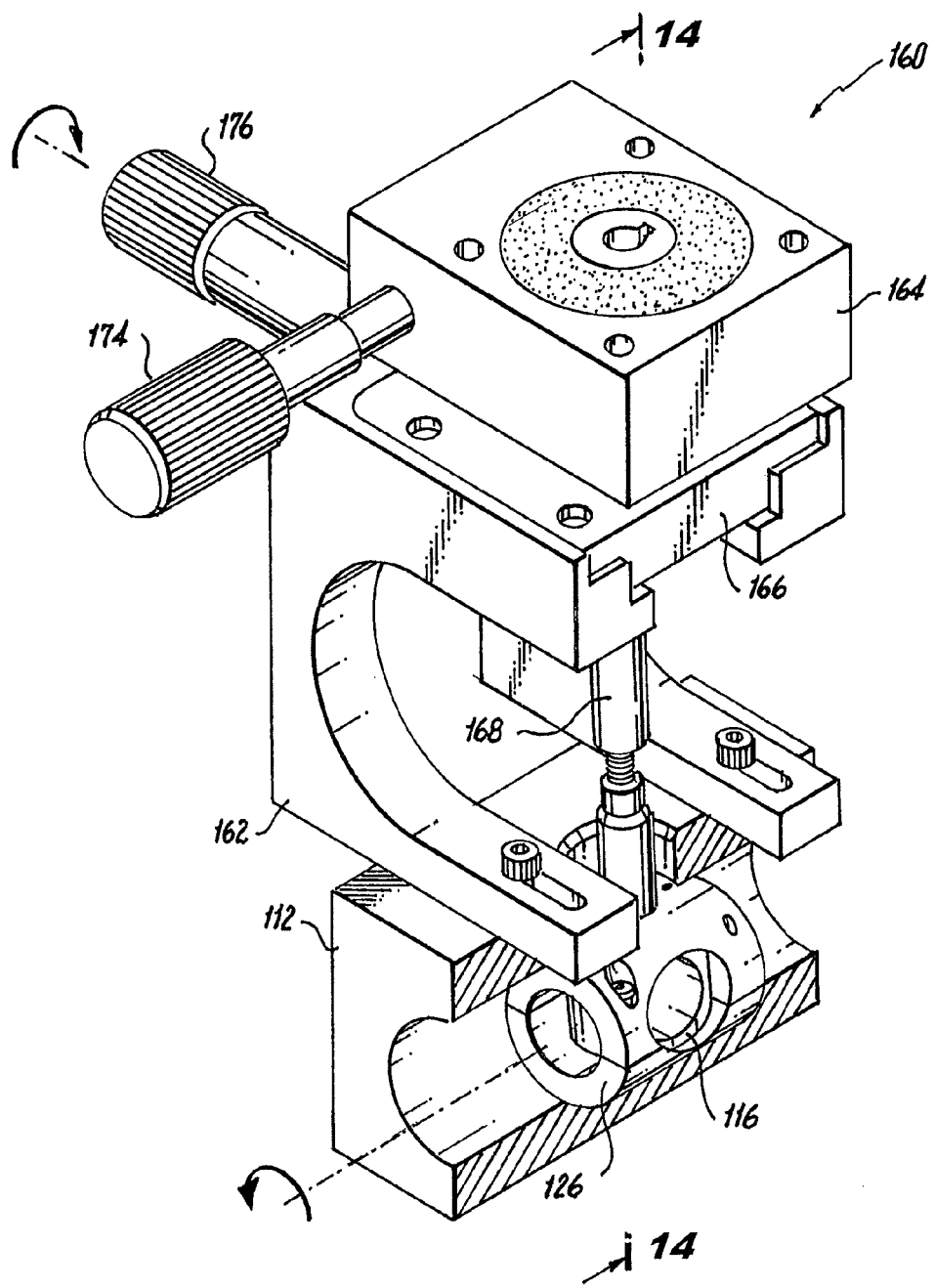
FIG. 13 is a perspective view as in FIG. 12, with the mount sectioned to show angular rotation of the roll cage about the tilt axis through manipulation of a control knob.

Turning now to FIGS. 12 and 13, there is illustrated an adjustment mechanism 160 for selectively adjusting the angular position of the gimbal 116 within the roll cage 126 about the pan axis of the gimbal 116 and the angular position of the roll cage 126 within the mounting structure 112 about the tilt axis of the roll cage 126. The adjustment mechanism includes a fixture or stage 162, supporting upper transmission box 164 and the lower guide box 166.

Figure 14:
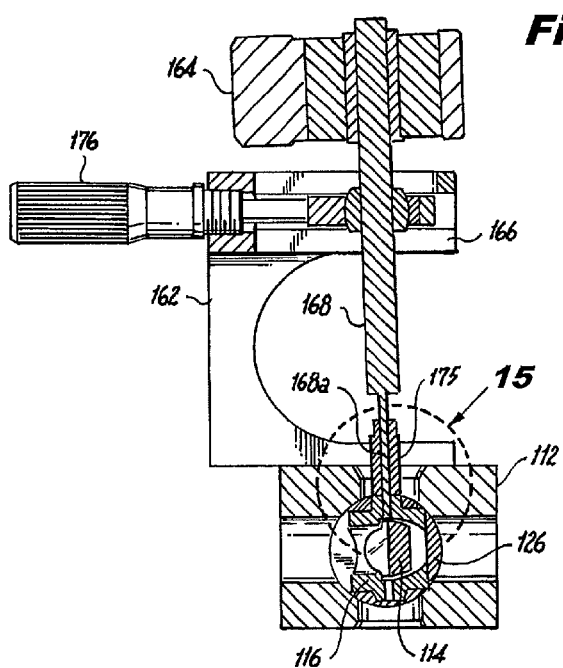
FIG. 14 is a cross-sectional view taken along line 14-14 of FIG. 13, illustrating the position of the roll cage, rotated through an angle of approximately 5° about the tilt axis, relative to the supporting mount.

An upper manual control knob 174 is operatively associated with an upper transmission box 164 for selectively controlling the axial rotation of the adjustment shaft 168, and hence the independent angular rotation of the gimbal 116 relative to the roll cage 126 about the pan axis as illustrated in FIG. 12. A lower manual control knob 176 is operatively associated with a lower guide box 166 for selectively controlling the tilt angle of adjustment shaft 168, and hence the independent angular rotation of the roll cage 126 relative to the mounting structure 12 about the tilt axis as illustrated in FIGS. 13 and 14. As in the previous embodiment, the ability to independently adjust the respective angular positions of the gimbal 116 and roll cage 126 advantageously eliminates cross-coupling at the optical surface of optical component 114.

Figure 15:
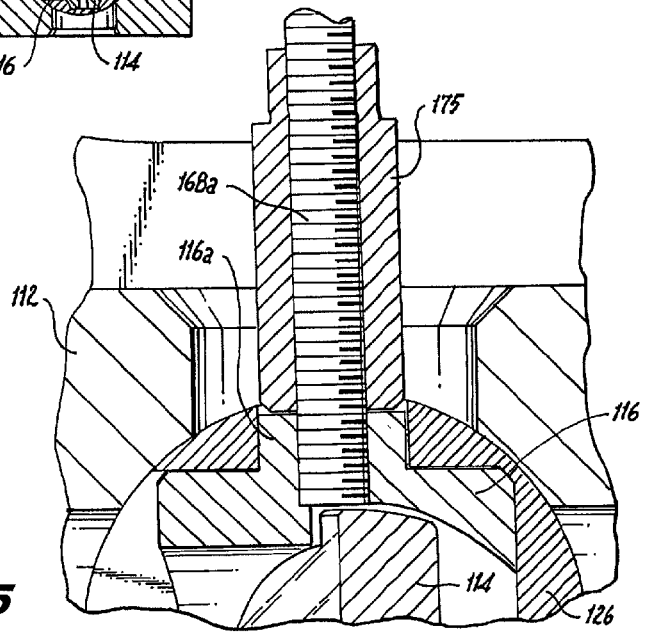
FIG. 15 is an enlarged localized view of the mechanical connection that exists between the elongated adjustment shaft and the gimbal hub of the optical steering device, as referenced from FIG. 14.

Referring to FIGS. 14 and 15, the distal end portion of the adjustment shaft 168 of adjustment mechanism 160 has a threaded stem 168a for threadably engaging the upper hub 116a of gimbal 116. An elongated locking nut 175 locks the threaded stem 168a of shaft 168 to the gimbal 116.

Figure 16:
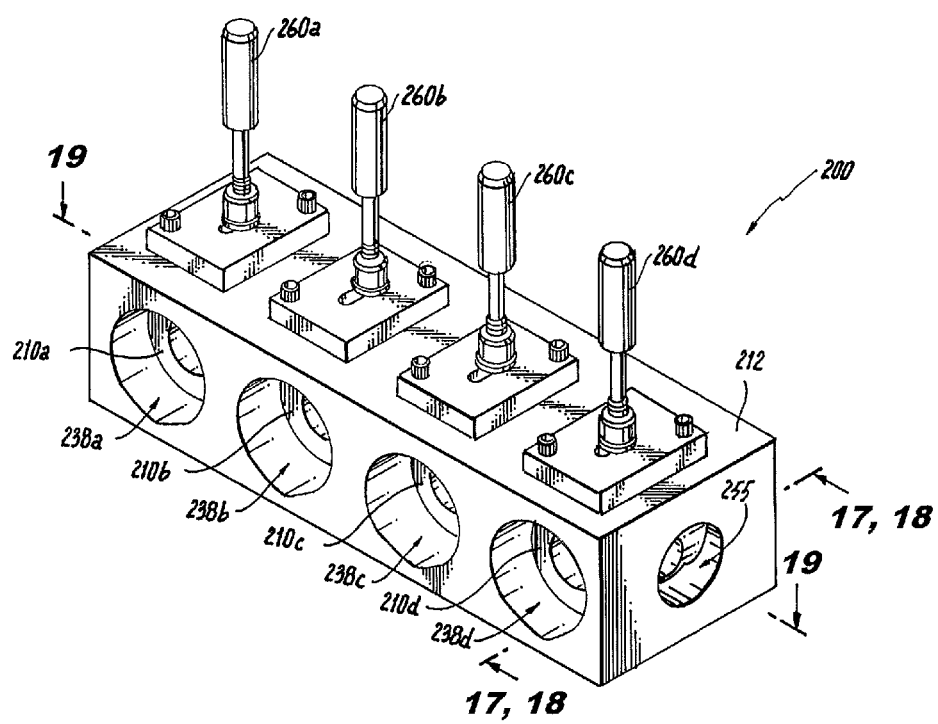
FIG. 16 is perspective view of an optical mounting assembly in which a plurality of optical steering devices are arranged parallel to each other for transmitting and reflecting plural optical beams.

Turning now to FIG. 16, there is illustrated another mounting configuration 200 wherein a plurality optical steering devices 10 of the subject invention are provided in a parallel arrangement for advantageously interacting with or otherwise transmitting and reflecting plural optical beams. This configuration is particularly useful for aligning multiple laser beams concentrically. More particularly, mounting configuration 200 includes an elongate mounting structure 212 supporting first through fourth optical steering devices 210a-210d in respective bores 238a-238. The device bores 238a-238d are interconnected by a transverse bore 255 that extends through the entirety of the mounting structure 212.

Figures 17, 18:
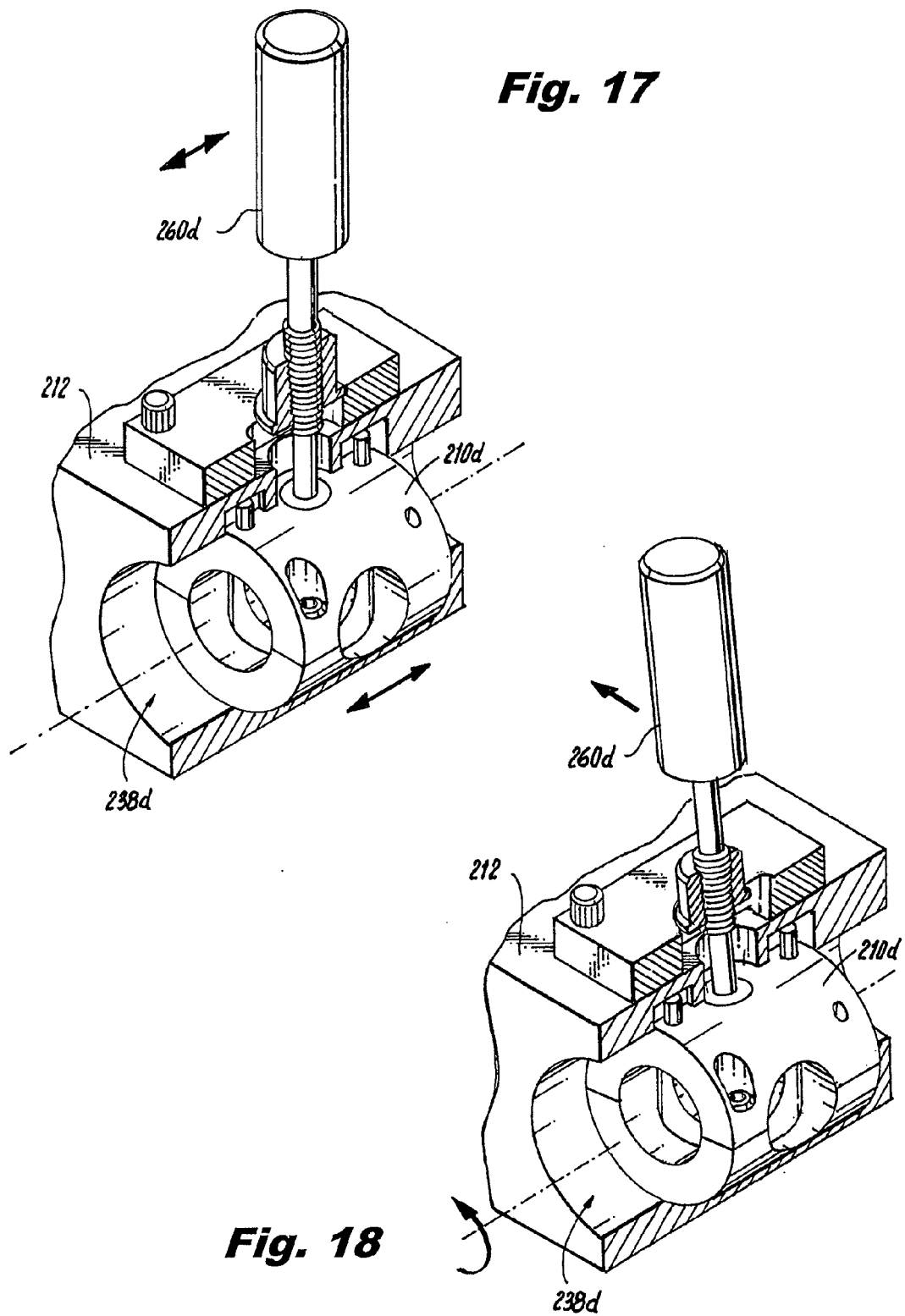
FIG. 17 is a cross-sectional view taken along line 17-17 of FIG. 16, showing the axial translation of an optical steering device along the tilt axis of the roll cage, through the manipulation of a control knob.
FIG. 18 is a cross-sectional view taken along line 17-17 of FIG. 16, showing the angular rotation of the roll cage about the tilt axis thereof, through the manipulation of a control knob.

In this embodiment of the subject invention, the optical steering devices 210a-210d are adapted and configured for axial translation along the tilt axis of the device, as shown in FIG. 17, as well as angular rotation about the tilt axis, as shown in FIG. 18. This is accomplished using independent adjustment mechanisms 260a-260d, each of which has an adjustment shaft 268a-268d having three degrees of freedom to adjust the pan angle of the gimbal, the tilt angle of the roll cage and the axial position of the steering device within the mounting structure 212.

Figure 19:
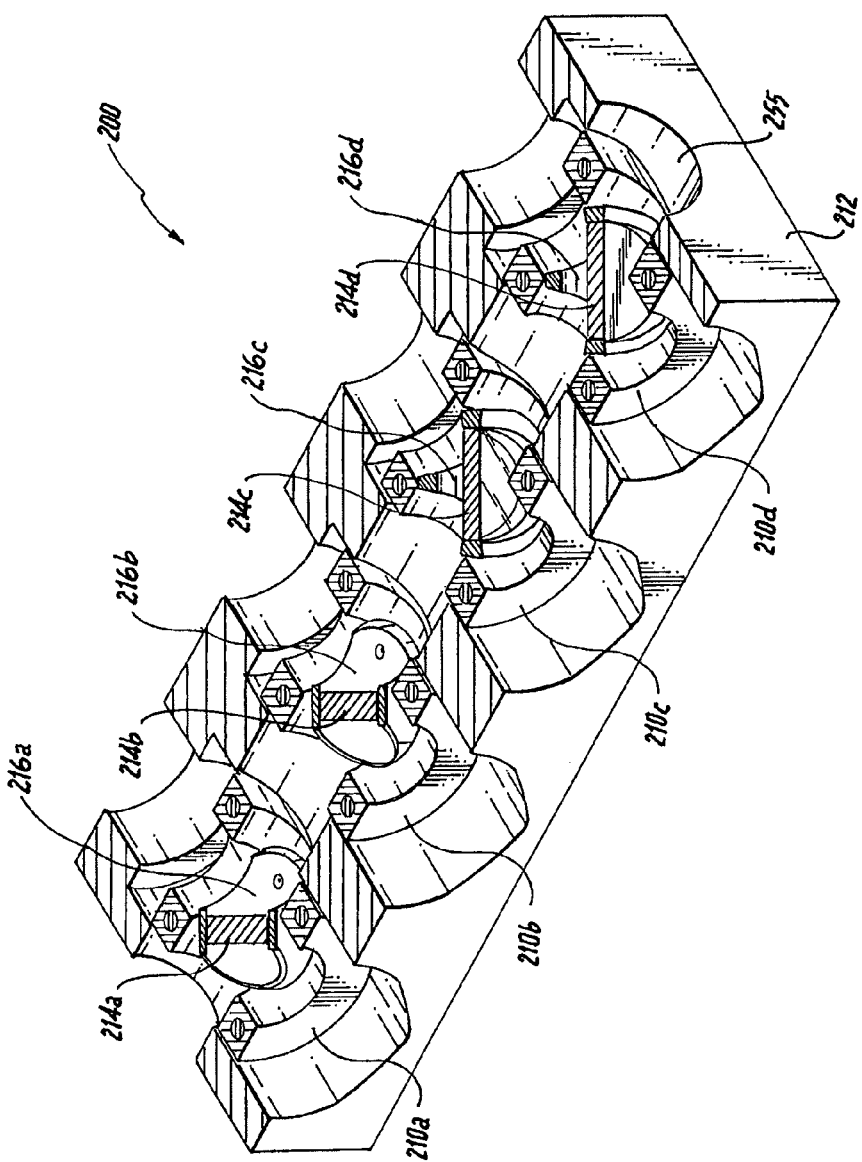
FIG. 19 is a cross-sectional view taken along line 19-19 of FIG. 16, showing the relative orientation of each optical component within the gimbal of a respective optical steering device.

Referring to FIG. 19, in an exemplary arrangement of mounting configuration 200, the optical components 214a, 214b in the gimbals 216a, 216b of the first and second steering devices 210a, 210b serve an input function and are oriented in one angular direction along parallel planes, while the optical components 214c, 214d in the gimbals 216c, 216d of the third and fourth steering devices 210c, 210d serve an output function and are oriented in an oppositely angled direction along parallel planes. Those skilled in the art will readily appreciate that the optical components 214a-214d can vary in function, depending upon the application. For example, these components can serve as lenses, mirrors, filters, transmitters, beam splitters, beam samplers, beam expanders or the like.

Figure 20:
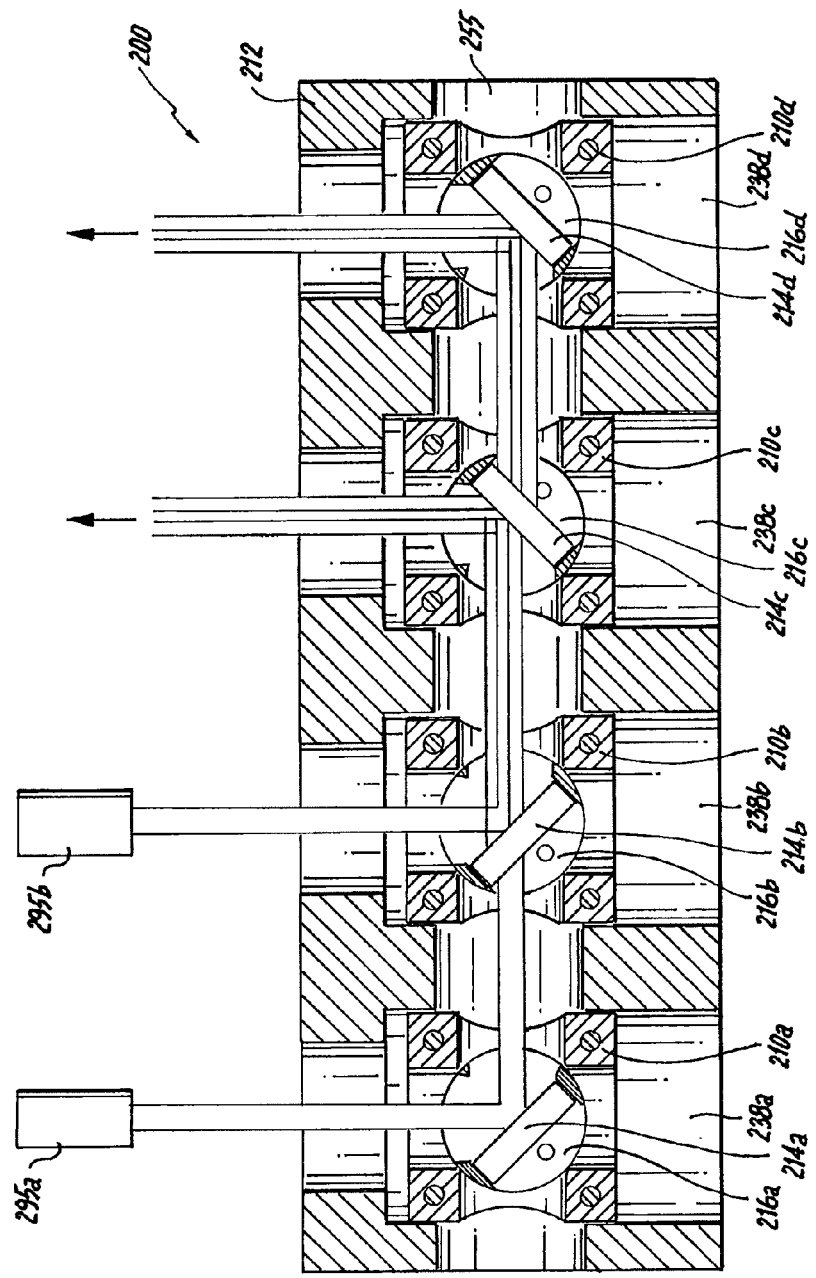
FIG. 20 is a top plan view of the optical mounting assembly as shown in FIG. 19, wherein all of the optical steering devices are disposed at a zero location.
Figure 21:
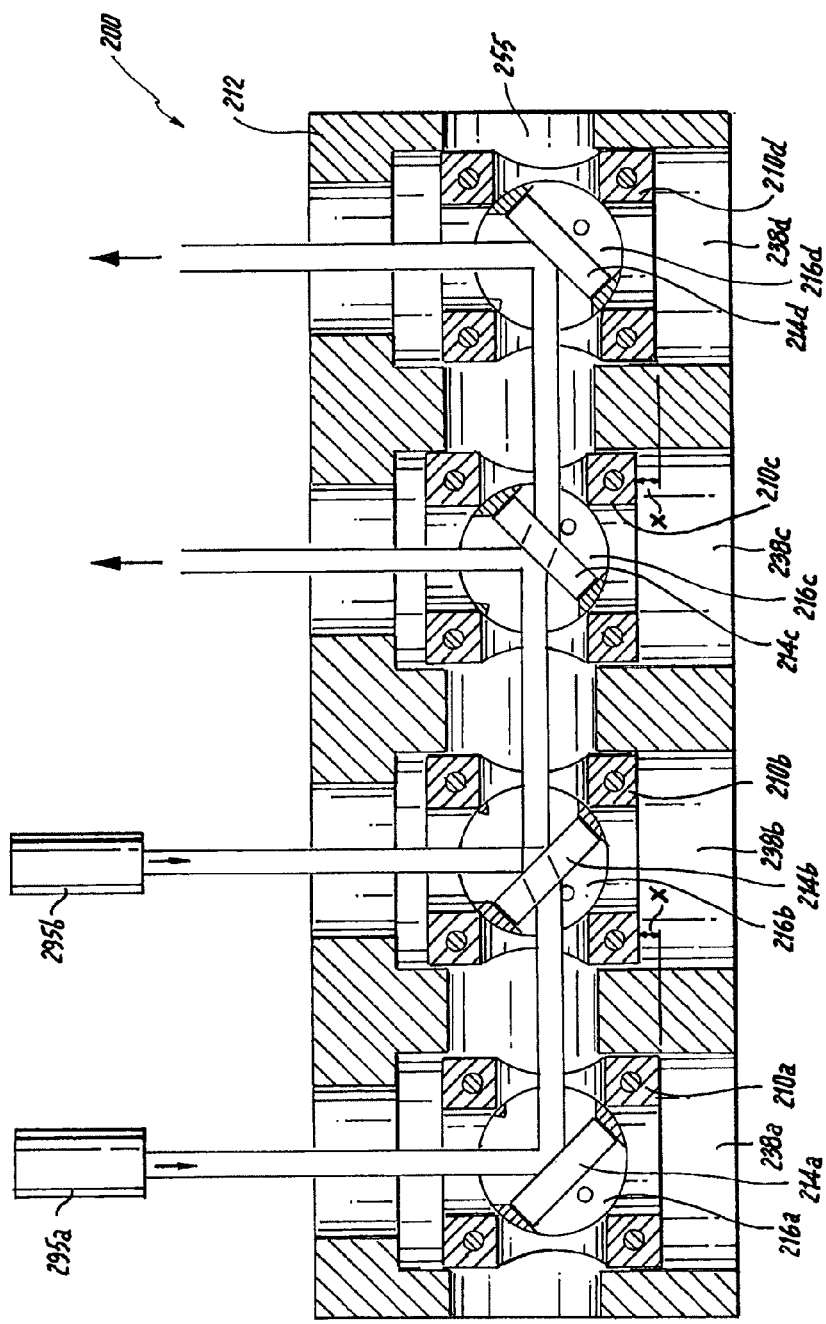
FIG. 21 is a top plan view of the optical mounting assembly as in FIG. 20, except that the first and fourth optical steering devices are displaced from the zero location relative to the second and third optical steering devices.

As shown in FIG. 20, the optical steering devices 210a-210d all have a common axial zero position within supporting structure 212. In that position, the optical components 214a-214d within gimbals 216a-216d are all aligned with one another for interacting with the input beams from light sources 295a, 295b. However, as shown in FIG. 21, the axial position of optical steering devices 210a, 210d are selectively adjusted relative to the zero position. This adjustment may be done for a variety of reasons, including, for example, to achieve a concentric beam output, for centering the beam outputs within mounting features, and for minimizing the possibility of vignetting, where the brightness or saturation of an image is reduced at the image periphery as compared to the image center.

While the optical beam steering device of the subject invention and the mounting assemblies therefor have been shown and described with reference to preferred embodiments, those skilled in the art will readily appreciate that various changes and/or modifications may be made thereto without departing from the spirit and scope of the subject invention as defined by the appended claims.

What is claimed is:

1. An optical beam steering device, comprising:
    a) an optical component for interacting with an optical beam;
    b) a gimbal supporting the optical component and defining a pan axis;
    c) a roll cage rotatably supporting the gimbal and defining a tilt axis, wherein the tilt axis is orthogonal to the pan axis;
    d) a mount that houses and rotatably supports the roll cage;
    e) means for locking the angular position of the roll cage with respect to the mount from an area located on the first side of the mount; and
    means for locking the angular position of the gimbal with respect to the roll cage from said area located on the first side of the mount.

2. An optical beam steering device as recited in claim 1, wherein the optical component is selected from the group consisting of a window, a lens, a mirror, a filter, a beam splitter, a beam sampler and a beam expander.

3. An optical beam steering device as recited in claim 1, further comprising adjusting means external to the mount for independently adjusting the angular position of the gimbal about the pan axis and the angular position of the roll cage about the tilt axis.

4. An optical beam steering device as recited in claim 3, wherein the adjusting means is adapted and configured to make independent adjustments of the angular position of the gimbal and the angular position of the roll cage from the area located on the first side of the mount.

5. An optical beam steering device as recited in claim 4, wherein the adjusting means includes a stage configured to be releasably secured to the first side of the mount.

6. An optical beam steering device as recited in claim 5, wherein the stage includes an elongated adjustment shaft for mechanically coupling with an axle portion of the gimbal.

7. An optical beam steering device as recited in claim 6, wherein the stage includes a first control knob operatively associated with the adjustment shaft for adjusting the angular position of the gimbal about the pan axis.

8. An optical beam steering device as recited in claim 6, wherein the stage includes a second control knob operatively associated with the adjustment shaft for adjusting the angular position of the roll cage about the tilt axis.

9. An optical beam steering device as recited in claim 6, wherein the means for locking the angular position of the gimbal with respect to the roll cage includes at least one fastener for operatively engaging a surface of the gimbal through the roll cage.

10. An optical beam steering device as recited in claim 3, wherein the adjusting means is adapted and configured to independently adjust the axial position of the roll cage along the tilt axis relative to the mount.

11. An optical beam steering device as recited in claim 1, wherein the means for locking the angular position of the roll cage with respect to the mount includes at least one fastener for operatively engaging a surface of the roll cage through the mount.

12. An optical beam steering device as recited in claim 1, wherein the roll cage includes an opening for receiving the gimbal.

13. An optical beam steering device as recited in claim 1, wherein the roll cage includes an interior seat for accommodating the gimbal.

14. An optical beam steering device as recited in claim 1, wherein the roll cage includes two half-sections.

15. An optical beam steering device as recited in claim 14, wherein the gimbal includes opposed hubs for rotatably engaging corresponding openings in each half-section of the roll cage.

16. An optical beam steering device as recited in claim 1, wherein the gimbal includes an interior seat for accommodating the optical component.

17. An optical beam steering device as recited in claim 16, wherein the interior seat is adapted and configured so that the center of an optical surface of the optical component seated therein is aligned with the pan axis of the gimbal.

18. An optical beam steering device as recited in claim 16, wherein the interior seat is adapted and configured so that the pan axis of the gimbal is in the same plane as the tilt axis of the roll cage.

19. An optical beam steering device, comprising:
    a) an optical component for directing an optical beam;
    b) a gimbal supporting the optical component and defining a pan axis;
    c) a roll cage rotatably supporting the gimbal and defining a tilt axis, wherein the tilt axis is orthogonal to the pan axis; and
    d) a mount which houses and rotatably supports the roll cage, wherein the angular position of the roll cage with respect to the mount and the angular position of the gimbal with respect to the roll cage are both locked from a common side of the mount.

20. An optical beam steering device as recited in claim 19, further comprising adjusting means external to the mount for independently adjusting the angular position of the gimbal about the pan axis and the angular position of the roll cage about the tilt axis.

21. An optical beam steering device as recited in claim 20, wherein the adjusting means is adapted and configured to make independent adjustments of the angular position of the gimbal and the angular position of the roll cage from the area located on the same side of the mount from which the roll cage and gimbal are locked.

22. An optical beam steering device as recited in claim 20, wherein the adjusting means is adapted and configured to independently adjust the axial position of the roll cage along the tilt axis relative to the mount.

23. An optical beam steering device as recited in claim 19, further comprising first fastening means for locking the angular position of the roll cage with respect to the mount and second fastening means for locking the angular position of the gimbal with respect to the roll cage.

\* \* \* \* \*